(12) United States Patent
Ahn

(10) Patent No.: US 11,334,578 B2
(45) Date of Patent: May 17, 2022

(54) METHOD, SYSTEM AND NON-TRANSITORY COMPUTER-READABLE RECORDING MEDIUM FOR SEARCHING FOR DOCUMENT COMPRISING FORMULA

(71) Applicant: CLASSCUBE CO., LTD., Seoul (KR)

(72) Inventor: Seong Chan Ahn, Seoul (KR)

(73) Assignee: CLASSCUBE CO., LTD., Seoul (KR)

( * ) Notice: Subject to any disclaimer, the term of this patent is extended or adjusted under 35 U.S.C. 154(b) by 0 days.

(21) Appl. No.: 17/041,034

(22) PCT Filed: Apr. 5, 2018

(86) PCT No.: PCT/KR2018/004024
§ 371 (c)(1),
(2) Date: Dec. 8, 2020

(87) PCT Pub. No.: WO2019/194334
PCT Pub. Date: Oct. 10, 2019

(65) Prior Publication Data
US 2021/0089546 A1    Mar. 25, 2021

(30) Foreign Application Priority Data
Apr. 2, 2018    (KR) .......................... 10-2018-0038143

(51) Int. Cl.
*G06F 16/2457*    (2019.01)
*G06F 16/2455*    (2019.01)

(52) U.S. Cl.
CPC .. *G06F 16/24578* (2019.01); *G06F 16/24553* (2019.01)

(58) Field of Classification Search
CPC .... H03M 13/615; G06F 17/10; G06F 40/111; G06K 2209/01; G06K 9/00456
(Continued)

(56) References Cited

U.S. PATENT DOCUMENTS

| 2011/0280481 A1* | 11/2011 | Radakovic ............. G06K 9/033 382/177 |
| 2013/0226562 A1* | 8/2013 | Arnon ..................... G06F 17/10 704/9 |

(Continued)

FOREIGN PATENT DOCUMENTS

| KR | 1020110050106 A | 5/2011 |
| KR | 1020120063442 A | 6/2012 |
| KR | 1020170042080 A | 4/2017 |

OTHER PUBLICATIONS

International Search Report of PCT/KR2018/004024 dated Dec. 19, 2018.

*Primary Examiner* — Robert W Beausoliel, Jr.
*Assistant Examiner* — Pedro J Santos
(74) *Attorney, Agent, or Firm* — Dinsmore & Shohl LLP; Yongsok Choi, Esq.

(57) ABSTRACT

According to one aspect of the invention, there is provided a method for searching for documents containing mathematical expressions, the method comprising the steps of: dividing a first document containing mathematical expressions into a plurality of components; comparing the plurality of components with a plurality of other components extracted from a plurality of other documents, with reference to weights respectively assigned to the plurality of components according to types of the components; and determining a document associated with the first document among the plurality of other documents, with reference to a result of the comparison, wherein the weights are adaptively adjusted according to a result of the determination of the document associated with the first document.

4 Claims, 3 Drawing Sheets

(58) Field of Classification Search
USPC .......................................................... 382/229
See application file for complete search history.

(56) References Cited

U.S. PATENT DOCUMENTS

| | | |
|---|---|---|
| 2016/0299981 A1 | 10/2016 | Lu et al. |
| 2016/0314348 A1* | 10/2016 | Wang .................... G06F 40/111 |
| 2018/0039690 A1 | 2/2018 | Zhai et al. |
| 2018/0357207 A1* | 12/2018 | Yi ......................... G06F 40/131 |

* cited by examiner

METHOD, SYSTEM AND NON-TRANSITORY COMPUTER-READABLE RECORDING MEDIUM FOR SEARCHING FOR DOCUMENT COMPRISING FORMULA

CROSS-REFERENCE TO RELATED APPLICATION(S)

This application is a national phase of Patent Cooperation Treaty (PCT) International Application No. PCT/KR2018/004024 filed on Apr. 5, 2018, which claims priority to Korean Patent Application No. 10-2018-0038143 filed on Apr. 2, 2018. The entire contents of PCT International Application No. PCT/KR2018/004024 and Korean Patent Application No. 10-2018-0038143 are hereby incorporated by reference.

FIELD OF THE INVENTION

The present invention relates to a method, system, and non-transitory computer-readable recording medium for searching for documents containing mathematical expressions.

BACKGROUND

As the technology for searching for documents is developed, various techniques for accurately finding documents similar to a specific document among numerous documents have been introduced.

As one example of related conventional techniques, there has been introduced a system for calculating similarity between documents, comprising: a keyword extraction unit configured to extract a keyword from a first document and further extract a keyword of the first document from at least one of a document referring to the first document and a document referred to by the first document; and a similarity calculation unit configured to calculate similarity between the first document and a second document subject to similarity determination using the extracted keywords.

However, most of the techniques introduced so far, including the above conventional technique, use a method of searching for similar documents focusing on keywords, and thus when documents containing mathematical expressions are searched for, there is a limitation in the method of finding similar documents because the mathematical expressions may vary in diverse forms. Further, undesirable search results are often provided to users because similar documents are searched for on the basis of predetermined weights.

SUMMARY OF THE INVENTION

One object of the present invention is to solve all the above-described problems in the prior art.

Another object of the invention is to accurately find similar documents containing mathematical expressions.

Yet another object of the invention is to provide an accurate search result by adaptively adjusting weights according to a result of comparison between documents.

The representative configurations of the invention to achieve the above objects are described below.

According to one aspect of the invention, there is provided a method for searching for documents containing mathematical expressions, the method comprising the steps of: dividing a first document containing mathematical expressions into a plurality of components; comparing the plurality of components with a plurality of other components extracted from a plurality of other documents, with reference to weights respectively assigned to the plurality of components according to types of the components; and determining a document associated with the first document among the plurality of other documents, with reference to a result of the comparison, wherein the weights are adaptively adjusted according to a result of the determination of the document associated with the first document.

According to another aspect of the invention, there is provided a system for searching for documents containing mathematical expressions, the system comprising: a component management unit configured to divide a first document containing mathematical expressions into a plurality of components; a comparison management unit configured to compare the plurality of components with a plurality of other components extracted from a plurality of other documents, with reference to weights respectively assigned to the plurality of components according to types of the components; and a document management unit configured to determine a document associated with the first document among the plurality of other documents, with reference to a result of the comparison, wherein the weights are adaptively adjusted according to a result of the determination of the document associated with the first document.

In addition, there are further provided other methods and systems to implement the invention, as well as non-transitory computer-readable recording media having stored thereon computer programs for executing the methods.

According to the invention, it is possible to accurately find similar documents containing mathematical expressions.

According to the invention, it is possible to provide an accurate search result by adaptively adjusting weights according to a result of comparison between documents.

DETAILED DESCRIPTION OF THE INVENTION

Figure 1:
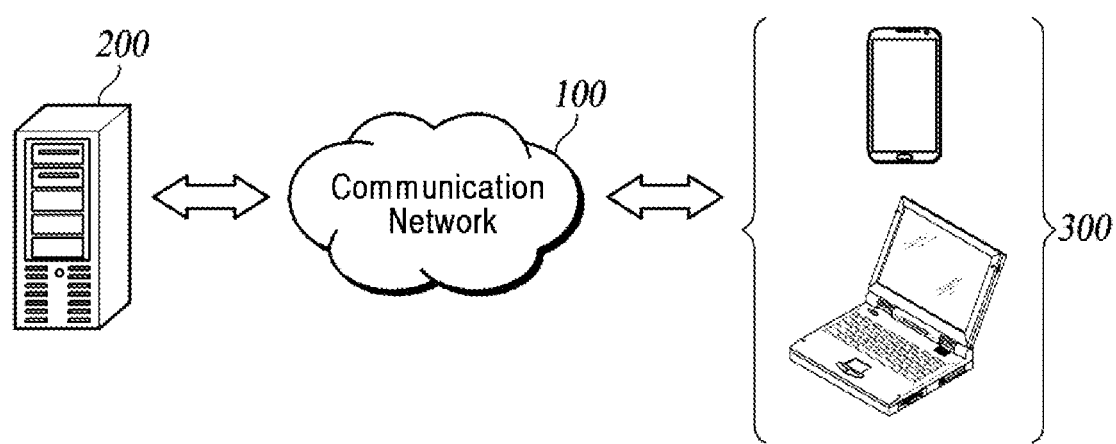
FIG. 1 schematically shows the configuration of an entire system for searching for documents containing mathematical expressions according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for searching for documents containing mathematical expressions according to one embodiment of the invention.

As shown in FIG. 1, the entire system according to one embodiment of the invention may comprise a communication network 100, a search system 200, and a device 300.

First, the communication network 100 according to one embodiment of the invention may be configured regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the search system 200 according to one embodiment of the invention may be a digital device having a memory means and a microprocessor for computing capabilities. The search system 200 may be a server system.

The search system 200 according to one embodiment of the invention may be connected with the device 300 to be described below via the communication network 100, and may function to: divide a first document containing mathematical expressions into a plurality of components; compare the plurality of components with a plurality of other components extracted from a plurality of other documents, with reference to weights respectively assigned to the plurality of components according to types of the components; and determine a document associated with the first document among the plurality of other documents, with reference to a result of the comparison.

Further, the search system 200 according to one embodiment of the invention may adaptively adjust the weights according to a result of the determination of the document associated with the first document.

The configurations and functions of the search system 200 according to the invention will be discussed in more detail below. Meanwhile, although the search system 200 has been described as above, the above description is illustrative and it will be apparent to those skilled in the art that at least a part of the functions or components required for the search system 200 may be implemented or included in the device 300 or an external system (not shown), as necessary.

Next, the device 300 according to one embodiment of the invention is digital equipment that may function to connect to and then communicate with the search system 200 via the communication network 100, and any type of portable digital equipment having a memory means and a microprocessor for computing capabilities, such as a smart phone and a tablet PC, may be adopted as the device 300 according to the invention.

Meanwhile, according to one embodiment of the invention, the device 300 may include an application for supporting document search according to the invention. The application may be downloaded from the search system 200 or an external application distribution server (not shown).

Configuration of the Search System

Hereinafter, the internal configuration of the search system 200 crucial for implementing the invention and the functions of the respective components thereof will be discussed.

Figure 2:
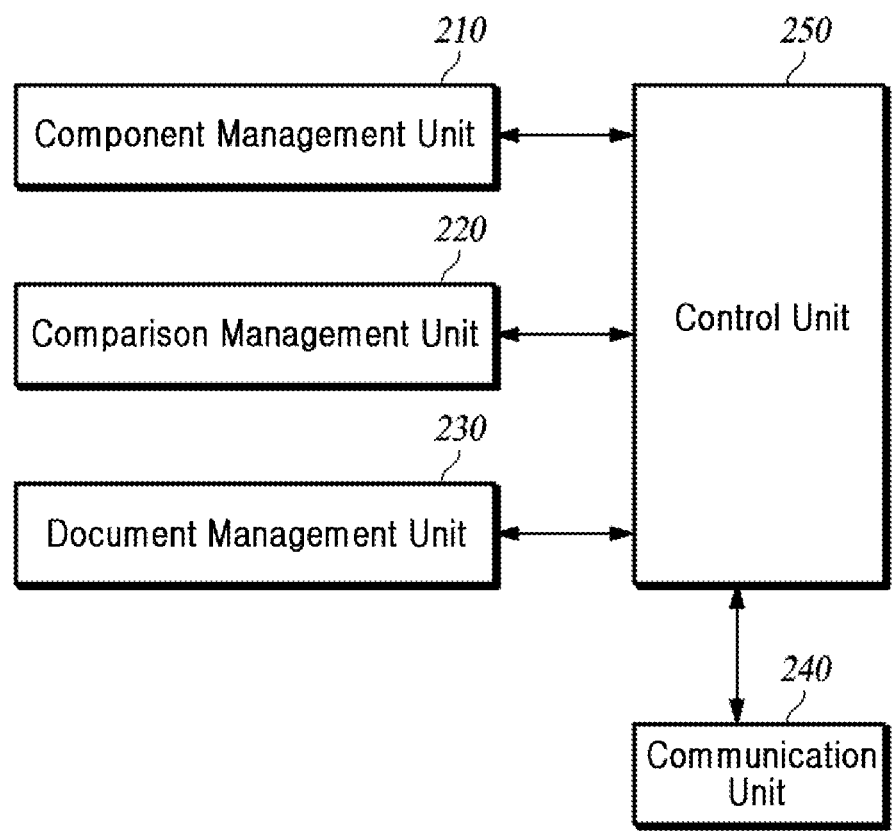
FIG. 2 specifically shows the internal configuration of a search system according to one embodiment of the invention.

FIG. 2 specifically shows the internal configuration of the search system 200 according to one embodiment of the invention.

As shown in FIG. 2, the search system 200 may comprise a component management unit 210, a comparison management unit 220, a document management unit 230, a communication unit 240, and a control unit 250. According to one embodiment of the invention, at least some of the component management unit 210, the comparison management unit 220, the document management unit 230, the communication unit 240, and the control unit 250 may be program modules to communicate with an external system. The program modules may be included in the search system 200 in the form of operating systems, application program modules, and other program modules, while they may be physically stored in a variety of commonly known storage devices. Further, the program modules may also be stored in a remote storage device that may communicate with the search system 200. Meanwhile, such program modules may include, but not limited to, routines, subroutines, programs, objects, components, data structures, and the like for performing specific tasks or executing specific abstract data types as will be described below in accordance with the invention.

First, the component management unit 210 according to one embodiment of the invention may function to divide a first document containing mathematical expressions into a plurality of components. According to one embodiment of the invention, the components may refer to text, numbers, symbols, images, tables, and the like that are separated and categorized into predetermined types (or attributes).

Specifically, the component management unit 210 according to one embodiment of the invention may divide contents included in the first document containing mathematical expressions according to a type of at least one component.

For example, according to one embodiment of the invention, the first document containing mathematical expressions may be a document related to mathematical problems, and the component management unit 210 may divide a mathematical problem included in the first document according to a type of at least one of a layout component such as fraction or integration, an operator component such as addition or subtraction, a constant component, a variable component, an image component, and a table component.

More specifically, according to one embodiment of the invention, when the mathematical problem in the first document is "cos x+cos y", "cos" is a layout component (hereinafter denoted as "L"), "x" and "y" are variable components (hereinafter denoted as "V"), and "+" is an operator component (hereinafter denoted as "O"), so that the first document may be divided as L("cos") V("x") O("+") L("cos") V("y"). Further, according to one embodiment of the invention, L, V, and O may represent the types of the components, respectively, and "cos", "x", "+", "cos", and "y" may represent the contents of the components, respectively.

Next, the comparison management unit 220 according to one embodiment of the invention may compare the plurality of components divided by the component management unit 210 with a plurality of other components extracted from a plurality of other documents, with reference to weights respectively assigned to the plurality of components according to types of the components.

Specifically, the comparison management unit 220 according to one embodiment of the invention may compare at least one of types and contents of the plurality of components divided by the component management unit 210 with at least one of types and contents of a plurality of other components extracted from a plurality of other documents, with reference to weights respectively assigned to the plurality of components according to types of the components. In this case, the weights according to one embodiment of the invention may be determined such that greater weights are assigned in the order of layout components, operator components, constant components, variable components, image components, table components, and text components.

Further, the comparison management unit 220 according to one embodiment of the invention may perform the comparison with further reference to an order in which at least one of the types and contents of the plurality of components are arranged in the first document.

For example, according to one embodiment of the invention, when the mathematical problem in the first document is "cos x+cos y", an order of the types of the components is L, V, O, L, and V, and an order of the contents of the components is "cos", "x", "+", "cos", and "y", so that the comparison management unit 220 may perform the above-described comparison with further reference to the order of the types of the components (i.e., L, V, O, L, and V) or the order of the contents of the components (i.e., "cos", "x", "+", "cos", and "y"). Meanwhile, in this case, according to one embodiment of the invention, the above comparison may be performed using only a part of the order of the types or contents of the components (e.g., L, V, and O out of L, V, O, L, and V).

Meanwhile, according to one embodiment of the invention, the weights assigned to types associated with mathematical expressions among the types of the plurality of components may be determined to be greater than the weights assigned to the other types.

For example, according to one embodiment of the invention, the weights assigned to layout components, operator components, constant components, and variable components, which may be the types associated with mathematical expressions, may be determined to be greater than the weights assigned to text components.

Next, the document management unit 230 according to one embodiment of the invention may determine a document associated with the first document among the plurality of other documents, with reference to a result of the comparison.

For example, the document management unit 230 according to one embodiment of the invention may determine a document having similarity equal to or greater than a predetermined level as the document associated with the first document among the plurality of other documents, with reference to the result of the comparison. In this case, the document management unit 230 according to one embodiment of the invention may adaptively adjust the weights respectively assigned to the plurality of components (e.g., may reduce the differences between the weights assigned according to the types of the components, or may assign a greater (or less) weight to a type of a specific component among the types of the plurality of components) according to a result of the determination of the document associated with the first document (e.g., when the number of the documents determined to be associated with the first document is not greater than a predetermined number), and may determine a document associated with the first document among the plurality of other documents, with reference to a result of the comparison performed again by the comparison management unit 220 with the adjusted weights.

Further, the document management unit 230 according to one embodiment of the invention may determine a document associated with the first document among the plurality of other documents, with further reference to feedback provided from a user along with the result of the comparison.

Specifically, the document management unit 230 according to one embodiment of the invention may determine a document associated with the first document among the plurality of other documents, with further reference to feedback provided from a user who receives the result of the comparison.

For example, according to one embodiment of the invention, a document having similarity equal to or greater than a predetermined level among the plurality of other documents may be provided to a user according to the result of the comparison as described above. In this case, the document management unit 230 according to one embodiment of the invention may receive feedback from the user in the form of at least one selection item or input item related to the provided document (e.g., whether the provided document is a similar document or not) and analyze the received feedback to specify a document that is not a similar document among the documents having similarity equal to or greater than the predetermined level. Further, the document management unit 230 according to one embodiment of the invention may determine a document other than the specified documents that are not similar documents among the documents similarity equal to or greater than the predetermined level as a document associated with the first document.

Next, the communication unit 240 according to one embodiment of the invention may function to enable data transmission/reception from/to the component management unit 210, the comparison management unit 220, and the document management unit 230.

Lastly, the control unit 250 according to one embodiment of the invention may function to control data flow among the component management unit 210, the comparison management unit 220, the document management unit 230, and the communication unit 240. That is, the control unit 250 according to the invention may control data flow into/out of the search system 200 or data flow among the respective components of the search system 200, such that the component management unit 210, the comparison management unit 220, the document management unit 230, and the communication unit 240 may carry out their particular functions, respectively.

Figure 3:
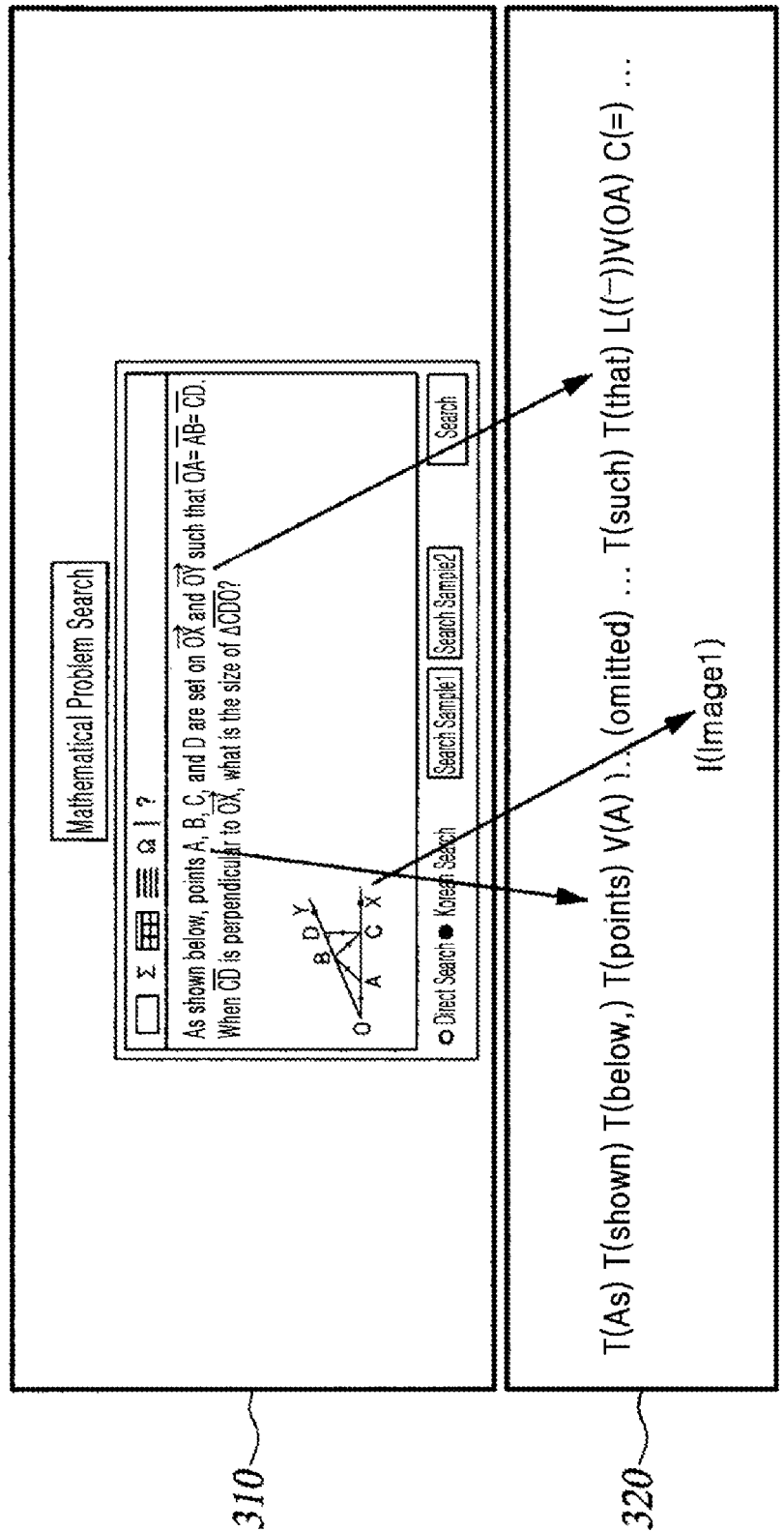
FIG. 3 illustratively shows how to search for documents according to one embodiment of the invention.

FIG. 3 illustratively shows how to search for documents according to one embodiment of the invention.

Referring to FIG. 3, according to one embodiment of the invention, a first document 310 containing mathematical expressions may be divided into a plurality of components 320. More specifically, the first document 310 may be divided as T(As) T(shown) T(below,) T(points) V(A) . . . (omitted) . . . T(such) T(that) L($^-$)V(OA) C(=) . . . (omitted) . . . I(Image1). Here, T represents a text component and I represents an image component.

Next, the search system 200 according to one embodiment of the invention may compare the plurality of components with a plurality of other components extracted from a plurality of other documents, with reference to weights respectively assigned to the plurality of components according to types of the components. For example, according to one embodiment of the invention, the weights respectively assigned to the plurality of components according to types of the components may be determined to be 2.0 for L, 1.8 for O, 1.0 for C, 0.8 for V, 0.6 for I, and 0.1 for T, and at least one of types and contents of the plurality of components divided from the first document 310 may be compared with at least one of types and contents of the plurality of other components extracted from the plurality of other documents, on the basis of the weights.

Next, according to one embodiment of the invention, the search system 200 may determine a document similar to the first document among the plurality of other documents, with reference to a result of the comparison and feedback of a user who receives the result of the comparison.

Meanwhile, according to one embodiment of the invention, when the number of the documents determined as above is not greater than a predetermined number, the weight assigned to at least one of the plurality of components divided from the first document 310 may be adaptively adjusted. For example, according to one embodiment of the invention, the weights respectively assigned to the plurality of components may be determined to be 1.9 for L, 1.8 for O, 0.8 for C, 1.0 for V, 0.8 for I, and 0.3 for T.

Next, according to one embodiment of the invention, a document similar to the first document among the plurality of other documents may be determined on the basis of a result of the comparison performed again with the adjusted weights and feedback of the user who receives the result of the comparison performed again.

The embodiments according to the invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method implemented in a system for searching for documents containing mathematical expressions, the system comprising a component management unit, a comparison management unit and a document management unit, and the method comprising the steps of:

dividing, by the component management unit, a first document containing mathematical expressions into a plurality of components;

comparing, by the comparison management unit, the plurality of components with a plurality of other components extracted from a plurality of other documents, with reference to weights respectively assigned to the plurality of components according to types of the components; and determining, by the document management unit, a document associated with the first document among the plurality of other documents, with reference to a result of the comparison, wherein the weights are adaptively adjusted in response to determining that a number of documents associated with the first document is out of a predetermined range, wherein the plurality of components comprise at least one of a layout component, an operator component, a constant component, a variable component, an image component, a table component and a text component, wherein the weights assigned to types associated with mathematical expressions among the types of the plurality of components are determined to be greater than the weights assigned to the other types, wherein in the comparing step, at least one of types and contents of the plurality of components are compared with at least one of types and contents of the plurality of other components, and wherein the comparison is performed with further reference to an order in which at least one of the types and contents of the plurality of components are arranged in the first document.

2. The method of claim 1, wherein the document associated with the first document is determined with further reference to feedback provided from a user.

3. A non-transitory computer-readable recording medium having stored thereon a computer program for executing the method of claim 1.

4. A system for searching for documents containing mathematical expressions, the system comprising:
- a component management unit configured to divide a first document containing mathematical expressions into a plurality of components;
- a comparison management unit configured to compare the plurality of components with a plurality of other components extracted from a plurality of other documents, with reference to weights respectively assigned to the plurality of components according to types of the components; and
- a document management unit configured to determine a document associated with the first document among the plurality of other documents, with reference to a result of the comparison,
- wherein the weights are adaptively adjusted in response to determining that a number of documents associated with the first document is out of a predetermined range,
- wherein the plurality of components comprise at least one of a layout component, an operator component, a constant component, a variable component, an image component, a table component and a text component,
- wherein the weights assigned to types associated with mathematical expressions among the types of the plurality of components are determined to be greater than the weights assigned to the other types,
- wherein the comparison management unit configured to compare at least one of types and contents of the plurality of components with at least one of types and contents of the plurality of other components, and
- wherein the comparison is performed with further reference to an order in which at least one of the types and contents of the plurality of components are arranged in the first document.

* * * * *